Jan. 6, 1942.  J. S. SHOCKEY  2,268,903

SPECTACLES

Filed July 22, 1940

INVENTOR.
Joseph S. Shockey
BY
ATTORNEYS.

Patented Jan. 6, 1942

2,268,908

UNITED STATES PATENT OFFICE 2,268,908

SPECTACLES

Joseph S. Shockey, Kansas City, Mo.

Application July 22, 1940, Serial No. 346,768

1 Claim. (Cl. 88—47)

This invention relates to spectacles and particularly an element thereof specially designed for interconnecting the nose-piece and temple bow and that may be employed either as a part of the spectacle construction when the latter is manufactured, or associated therewith as a replacement or an additional part after the spectacles have been worn a length of time.

This invention has for one of its important aims the provision of a new article of manufacture in the form of a spectacle bar, the particular nature of which is such as to permit quick and easy attachment to the nose-piece of the spectacles and which may have the temple bow attached thereto without altering the same, all to the end that spectacles of less modern design may be brought to date as regards appearance, comfort and safety.

Another important object of this invention is to provide spectacles with a bar, portions of which are laterally arched and disposed in planes perpendicular to each other so that a distinct balance and rigid association of parts is accomplished.

The particular manner of making a bar for spectacles that embodies the present invention, will appear during the course of the following specification, referring to the accompanying drawing wherein.

Figure 1:
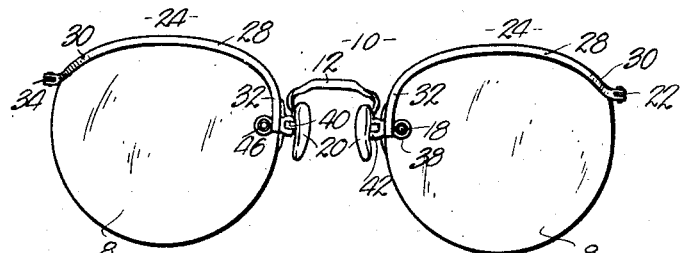
Figure 1 is an elevational view of a pair of spectacles having bars thereon, made in accordance with the present invention.

It is known in the art that spectacles include a pair of lenses 8 joined to the proximal edges by a nose-piece generally designated by the numeral 10, and which consists of a bridge 12, arcuate necks 14, embracing elements 16 and screws 18. Pads 20 attached to necks 14 normally engage the sides of the nostrils, while lenses 8 are supported before the eyes of the wearer.

Figure 2:
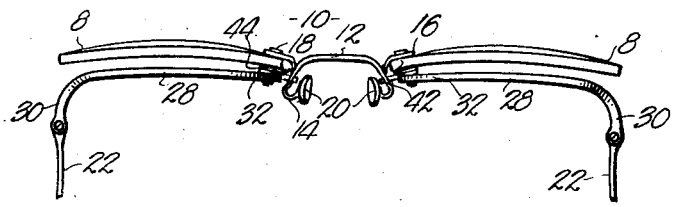
Fig. 2 is a top plan view of the spectacles showing the bars in spaced relation with the lenses.
Figure 3:
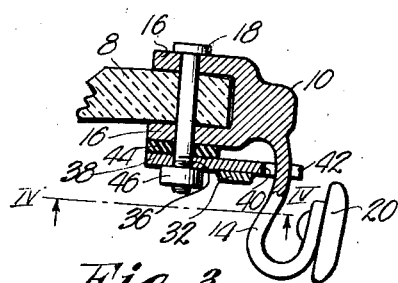
Fig. 3 is an enlarged fragmentary detailed sectional view through the zone of connection between the spectacle nose-piece and one of the lenses, showing the manner of joining the bar thereto.
Figure 5:
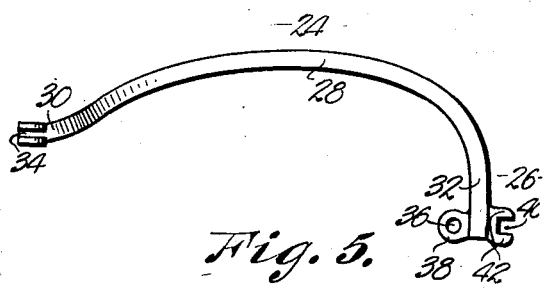
Fig. 5 is a side elevational view of the bar per se.
Figure 4:
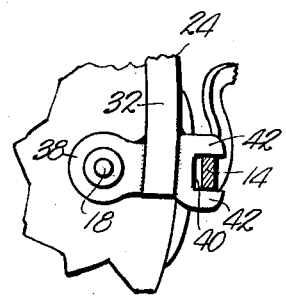
Fig. 4 is a fragmentary sectional view through a portion of the spectacles, taken on line IV—IV of Fig. 3.
Figure 6:
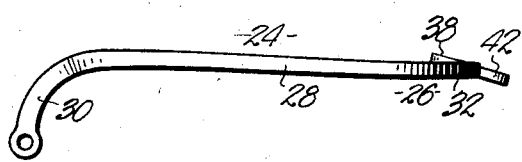
Fig. 6 is a top plan view of the bar entirely removed from the remaining parts of the spectacles.

The temple bows 22, shown in a fragmentary manner in Fig. 2, are usually attached directly to lenses 8, but because of the strain upon the material from which these lenses are made, the same are often-times cracked or broken, which makes it desirable to have a direct metallic connection between temple bows 22 and nose-piece 10.

Efforts have heretofore been expended to produce a satisfactory article of manufacture which would be well balanced and overcome the difficulties arising from the necessity of negotiating a relatively great distance between nose-piece 10 and temple bows 22. A few of the prior conceived structures have been placed in commercial use and because of the desirability of adopting such arrangement of parts, the bar made and applied as illustrated herewith, has met with success.

The bar broadly designated by the numeral 24 must be made to present "rights" and "lefts" for the angularity between lens and nose-piece 8 and 10 at the point where nose-piece 10 attaches thereto, is usually great and therefore an angled head 26 must form a part of bar 24.

Bar 24 comprises a longitudinally arched bow 28 at each end of which is presented a laterally extending portion 30 and 32 respectively. Portion 30 is arched as shown in Fig. 2, and extends rearwardly from the respective lens 8. The free end of arched, laterally extending portion 30 is, in this instance, bifurcated as at 34 to receive one end of temple bow 22. Such structure allows the use of the conventional temple bow for the standard manner of attaching such temple bows to either rimless glasses, or those having rims, is by means of a lug, not here shown, straddling the end of the temple bow.

Arcuate portion 32 of bar 28 is in a plane perpendicular to the plane wherein lies portion 30. This portion 32 extends downwardly to the nose-piece 10 from the upper edge of the respective lens 8 and at that point, head 26 is engaged by screw 18 which passes through the perforation 36 of loop 38.

Head 26 is notched as at 40 to present a pair of ears 42, one of which lies above neck 14 of nose-piece 10, while the other projects below said neck 14. Head 26 is disposed in a plane at an angle to and intersecting the major plane of bar 28. Thus, as shown in Fig. 2, the bars are in alignment and lenses 8 are allowed to remain in the effective position without discomfort to the wearer.

To overcome shock and to further equalize the inner engagement of the parts, a spacer 44 of shock absorbing material is used between nose-piece 10 and head 26. Screw 18 is that normally used but if the workman finds the conventional screw too short, a longer one may be applied before nut 46 is moved into the clamped position.

The manner of attaching the bar made to embody the concepts of this invention, is clear to one skilled in the art, and while the bar may be slightly altered to meet specific peculiarities of any installation, it is desirable not to depart from the features stressed in the foregoing specification.

Having thus described the invention, what is claimed as new and desired to be secured by Letters Patent is:

In spectacles of the character described having a lens, a nose-piece, and a temple bow; a bar interconnecting the nose-piece and temple bow comprising a body formed of a length of wire longitudinally arched to conform to the edge contour of the lens and spaced from the lens throughout its length; a portion extending laterally from the body and rearwardly from the lens having means at its free end for receiving one end of the temple bow; and a head on the other end of the body extending outwardly on each of two sides of the body, said head being provided with a pair of ears for engaging the nose-piece; said nose-piece including a bridge, an arcuate neck projecting rearwardly of said bridge and having a nose pad attached thereto for engaging the sides of the nostrils, the said ears engaging the upper and lower edges of said neck at a point proximal to and rearwardly of the bridge whereby the neck may be bent to move the pad from side-to-side between the ears as the body remains in its normal spaced position with respect to the lens.

JOSEPH S. SHOCKEY.